US012587227B2

(12) United States Patent　　　　(10) Patent No.:　US 12,587,227 B2
Dally　　　　　　　　　　　　　　　(45) Date of Patent:　Mar. 24, 2026

(54) DYNAMIC BIT INVERSION FOR REDUCED OVERHEAD DC-BALANCED CODING

(71) Applicant: NVIDIA Corporation, Santa Clara, CA (US)

(72) Inventor: William James Dally, Incline Village, NV (US)

(73) Assignee: NVIDIA Corporation, Santa Clara, CA (US)

( * ) Notice:　Subject to any disclaimer, the term of this patent is extended or adjusted under 35 U.S.C. 154(b) by 33 days.

(21) Appl. No.: 18/927,886

(22) Filed:　Oct. 26, 2024

(65)　　　　　Prior Publication Data

US 2025/0392336 A1　　Dec. 25, 2025

Related U.S. Application Data

(60) Provisional application No. 63/662,470, filed on Jun. 21, 2024.

(51) Int. Cl.
H04L 25/49　　　(2006.01)
H04B 1/38　　　(2015.01)

(52) U.S. Cl.
CPC ..................................... H04B 1/38 (2013.01)

(58) Field of Classification Search
CPC ....... H04B 1/38; H03M 5/145; H03M 13/611; H03M 5/00; H04L 1/0057; H04L 49/1507
USPC .......................... 375/292, 288, 289, 282, 361
See application file for complete search history.

(56)　　　　　　References Cited

U.S. PATENT DOCUMENTS

| | | | | |
|---|---|---|---|---|
| 6,333,704 B1 * | 12/2001 | Jung | ........................ | H03M 5/00 |
| | | | | 341/56 |
| 7,425,907 B1 * | 9/2008 | Chaichanavong | .... | H03M 5/145 |
| | | | | 341/59 |
| 2014/0064357 A1 * | 3/2014 | Barrett | ................ | H04L 49/1507 |
| | | | | 375/240 |
| 2022/0368353 A1 * | 11/2022 | Sugioka | ............... | H03M 13/611 |
| 2023/0223953 A1 * | 7/2023 | Unuma | ................. | H04L 1/0057 |
| | | | | 341/50 |
| 2023/0308210 A1 * | 9/2023 | Sugioka | ................ | H03M 5/145 |

\* cited by examiner

*Primary Examiner* — Phuong Phu

(74) *Attorney, Agent, or Firm* — Leydig, Voit & Mayer, Ltd.

(57)　　　　　　ABSTRACT

Embodiments of the present disclosure relate to dynamic bit inversion for reduced overhead DC balanced coding. A computed polarity bit controls whether or not bits are inverted and is inserted in the data stream whenever DC balancing is triggered. Fixed overhead codes are commonly used to provide DC balance. However, one can do much better than a fixed overhead code by observing that many data streams are inherently DC balanced, and a random data stream does not need a correction to its disparity every byte. For example, a string of alternating 1s and 0s is naturally DC balanced. The dynamic bit inversion code has the property that overhead is inserted only when needed. For a string of alternating 1s and 0s there is no overhead. In an example, the overhead is about 4%, about ⅓ that of a fixed overhead 8 bit/9 bit code with the same maximum output disparity.

26 Claims, 12 Drawing Sheets

400

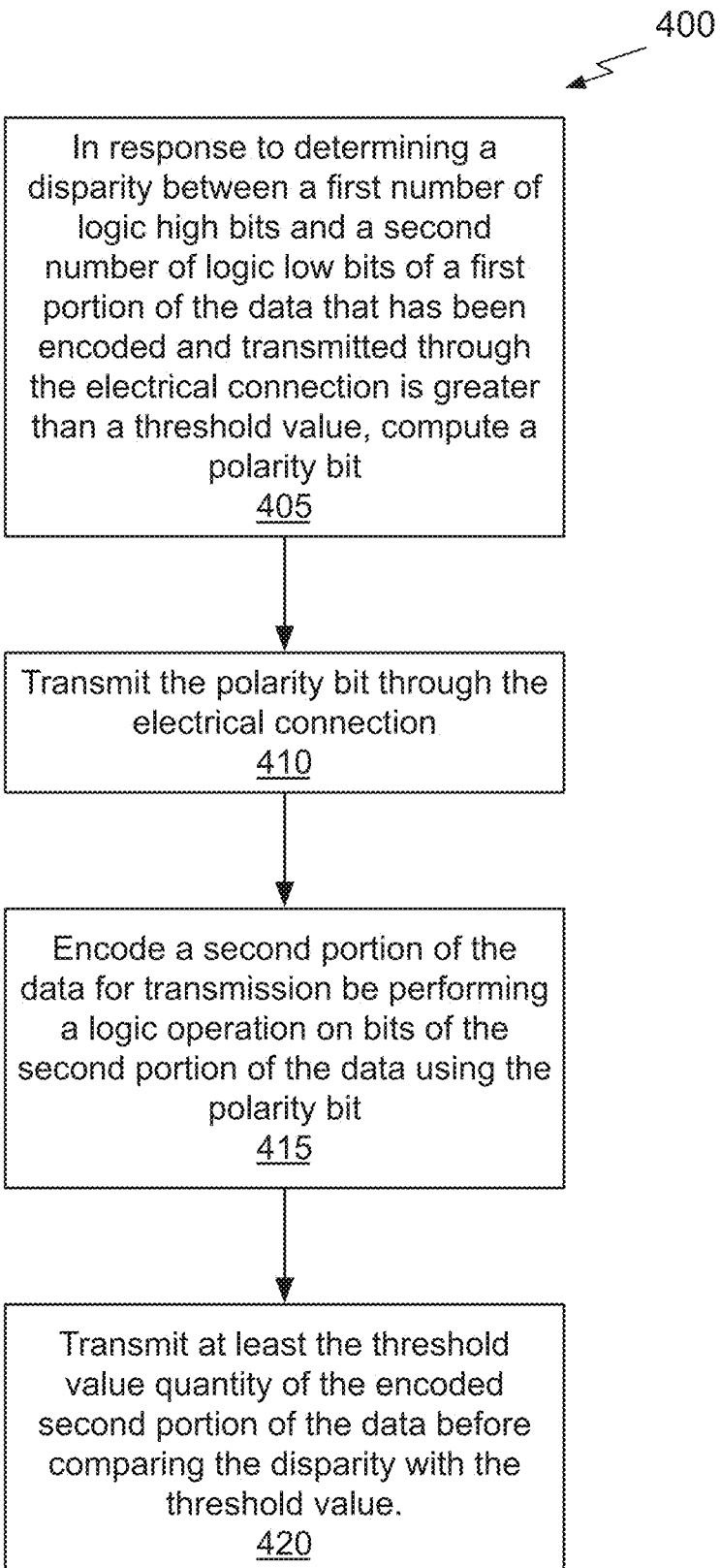

In response to determining a disparity between a first number of logic high bits and a second number of logic low bits of a first portion of the data that has been encoded and transmitted through the electrical connection is greater than a threshold value, compute a polarity bit
405

Transmit the polarity bit through the electrical connection
410

Encode a second portion of the data for transmission be performing a logic operation on bits of the second portion of the data using the polarity bit
415

Transmit at least the threshold value quantity of the encoded second portion of the data before comparing the disparity with the threshold value.
420

DYNAMIC BIT INVERSION FOR REDUCED OVERHEAD DC-BALANCED CODING

CLAIM OF PRIORITY

This application claims the benefit of U.S. Provisional Application No. 63/662,470 titled "Dynamic Bit Inversion for Reduced Overhead DC-Balanced Coding," filed Jun. 21, 2024, the entire contents of which is incorporated herein by reference.

BACKGROUND

Many communication links require that the data transmitted be DC balanced, i.e., the number of logic high bits (1s) and logic low bits (0s) transmitted should be equal within some margin. DC balancing may be required because the channel is AC coupled or otherwise band-limited so that it cannot pass a DC component. For an optical communication system DC balancing may be needed to keep the power dissipation in a component constant, to avoid frequency drift due to data-dependent self-heating.

Conventional solutions rely on fixed overhead codes that are used to encode the data to improve DC balance and are inserted into the transmitted data to enable decoding of the data at a receiver. Overhead of conventional solutions is 12.5% or 25%. However, many data streams are inherently DC-balanced, so the fixed overhead techniques are unnecessarily burdensome. There is a need for addressing these issues and/or other issues associated with the prior art.

SUMMARY

Embodiments of the present disclosure relate to dynamic bit inversion for reduced overhead DC balanced coding. Systems and methods are disclosed for dynamic bit inversion using a computed polarity bit (P). The polarity bit controls whether or not the bits are inverted and is inserted in the data stream whenever DC balancing is triggered.

Fixed overhead codes are commonly used to provide DC balance. The common 8B10B code, for example, encodes each 8 bit input byte into a 10 bit codeword. This code tightly limits maximum disparity and run-length but has a heavy overhead of 25%-two overhead bits for every 8 data bits. A bit inversion code can reduce the overhead, at the expense of some increase in maximum run-length and disparity. For example, the 8 bit/9 bit inversion code encodes an 8-bit input into a 9-bit codeword consisting of a polarity bit, P, and an 8 bit data word. If P=0 the 8-bit data word is equal to the input word, if P=1, the 8-bit data word is the complement of the 8-bit input word. The 8 bit/9 bit inversion code has a maximum disparity of 12 with an overhead of 12.5%-one overhead bit for every 8 data bits. Bit inversion codes can be generalized for any length data word as an Nbit/(N+1) bit code with a maximum disparity of $1.5N$ and an overhead of $1/N$.

On average, one can do much better than a fixed overhead code by observing that many data streams are inherently DC balanced, and a random data stream does not need a correction to its disparity every byte. For example, a string of alternating 1s and 0s is naturally DC balanced. In contrast to conventional systems, such as those described above, the dynamic bit inversion code has the property that overhead is inserted only when needed. For a string of alternating 1s and 0s there is no overhead. Empirically, for a randomly generated binary string and M=8, the overhead is about 4%, about ⅓ that of a fixed overhead 8 bit/9 bit code with the same maximum output disparity. For example, on a random string of 224 bits, the overhead is 3.9%.

In an embodiment, the method of encoding data for transmission through an electrical connection includes, in response to determining a disparity between a first number of logic high bits and second number of logic low bits of a first portion of the data that has been encoded and transmitted through the electrical connection is greater than a threshold value, a polarity bit is computed. The polarity bit is transmitted through the electrical connection and a second portion of the data is encoded for transmission by performing a logic operation on bits of the second portion of the data using the polarity bit. At least the threshold value quantity of the encoded second portion of the data is transmitted before comparing the disparity with the threshold value.

BRIEF DESCRIPTION OF THE DRAWINGS

The present systems and methods for dynamic bit inversion for reduced overhead DC balanced coding are described in detail below with reference to the attached drawing figures, wherein:

FIG. 4 illustrates a flowchart of a method for dynamic bit inversion DC balanced encoding, in accordance with an embodiment.

DETAILED DESCRIPTION

Figure 1A:
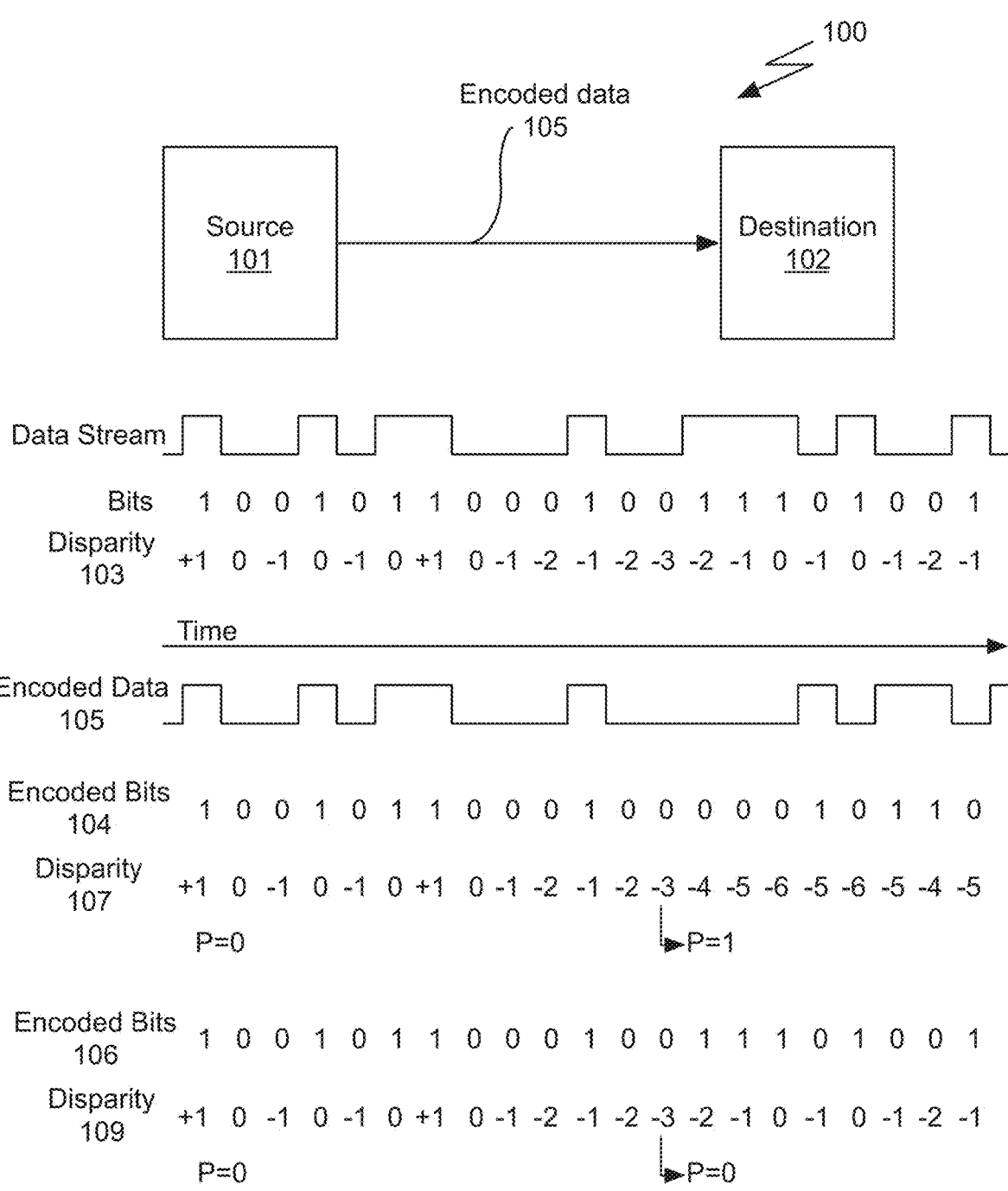
FIG. 1A illustrates a conceptual diagram of a dynamic bit inversion DC balanced data stream, in accordance with an embodiment.

Systems and methods are disclosed related to dynamic bit inversion for reduced overhead DC-balanced coding. A computed polarity bit controls whether or not bits are inverted and is inserted in the data stream whenever DC balancing is triggered.

Many communication links require that the data transmitted be DC balanced, i.e., the number of logic high bits (1s) and logic low bits (0s) transmitted should be equal within some margin. DC balancing may be required because the channel is AC coupled or otherwise band-limited so that it cannot pass a DC component. For an optical communication system DC balancing may be needed to keep the power dissipation in a component constant, to avoid frequency drift due to data-dependent self-heating.

Fixed overhead codes are commonly used to provide DC balance. The common 8 bit/10 bit code, for example, encodes each 8 bit input byte into a 10 bit codeword. This code tightly limits maximum disparity and run-length but has a heavy overhead of 25%-two overhead bits for every 8 data bits. A bit inversion code can reduce the overhead, at the expense of some increase in maximum run-length and disparity. For example, the 8 bit/9 bit inversion code encodes an 8-bit input into a 9-bit codeword consisting of a polarity bit, p, and an 8 bit data word. If p=0 the 8-bit data word is equal to the input word, if p=1, the 8-bit data word is the complement of the 8-bit input word. The 8 bit/9 bit inversion code has a maximum disparity of 12 with an overhead of 12.5%-one overhead bit for every 8 data bits. Bit inversion codes can be generalized for any length data word as an Nbit/(N+1) bit code with a maximum disparity of 1.5N and an overhead of 1/N.

On average, one can do much better than a fixed overhead code by observing that many data streams are inherently DC balanced, and a random data stream does not need a correction to its disparity every byte. For example, a string of alternating 1s and 0s is naturally DC balanced. To take advantage of the fact that many bit strings may be DC balanced and therefore may need less frequent correction, a dynamic bit-inversion code may be used. The dynamic bit-inversion code keeps a running count of the disparity D (number of Is-number of 0s) transmitted. While the absolute value of this disparity is below a maximum, M, the bits are transmitted as is and no overhead is incurred. If |D| reaches M, a polarity p is calculated that causes the next M bits (plus the polarity bit) to adjust the disparity in the correct direction. When [D]≥M, the polarity bit, p, is inserted into the bit stream and subsequent bits are exclusive-ORed with P before being transmitted. Disparity is ignored for the next M bits and then the process repeats.

In contrast to conventional systems, such as those described above, the dynamic bit inversion code has the property that overhead is inserted only when needed. For a string of alternating 1s and 0s there is no overhead. Empirically, for a randomly generated binary string and M=8, the overhead is about 4%, about ⅓ that of a fixed overhead 8 bit/9 bit code with the same maximum output disparity. For example, on a random string of 224 bits, the overhead is 3.9%.

FIG. 1A illustrates a conceptual diagram 100 of a dynamic bit inversion DC balanced data stream, in accordance with an embodiment. Encoded data 105 (a bitstream) is transmitted from a source 101 to a destination 102. An example data stream is illustrated by the waveform where each bit in the data stream is a logic high (binary one) or low (binary zero). The bits are received from left to right order by the destination 102, where the leftmost bit is transmitted first and bits to the right are subsequent bits. The source 101 dynamically computes a disparity 103 (D) by incrementing for each logic high bit and decrementing for each logic low bit. When the absolute value of the disparity 103 is equal or greater than a threshold value (M), computation and transmission of the polarity bit (p) is triggered. For M=3 when the disparity 103 is −3, the trigger causes P to be calculated by the source 102. If p changes from 0 to 1, the source 102 inverts each subsequent bit of the data (p is XORed with each bit) to produce the encoded bits 104 and the encoded data 105 waveform.

However, as shown in FIG. 1A, simply inverting (toggling) p actually increases the disparity 107 and does not improve the DC balance. Note that the absolute disparity of the encoded data 105 after p=1 increases to |−6| and the DC balance worsens. Therefore, a lookahead feature is used to calculate p using the current disparity combined with the disparity of a number of bits not yet encoded and transmitted. In an embodiment, the number of bits is M. When p is calculated using lookahead, p remains unchanged at 0 and each encoded bit in encoded bits 106 is unchanged compared with the original bit values. By keeping p at 0, the absolute value of disparity 109 is reduced and the DC balance improves. Because the absolute disparity may not be immediately reduced, the trigger is inhibited (prevented from causing a recalculation and retransmission of p) until at least M bits are encoded by the source 101 for transmission to the destination (receiver) 102.

When calculation of p is triggered, the source 101 inserts p into the encoded data stream. The destination 102 also computes disparity on the received data stream, before the data stream is decoded. When the absolute disparity computed by the destination 102 equals or exceeds the threshold value M, the polarity bit p is extracted and a received polarity used by the destination 102 to decode the data stream is updated to the extracted polarity bit.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
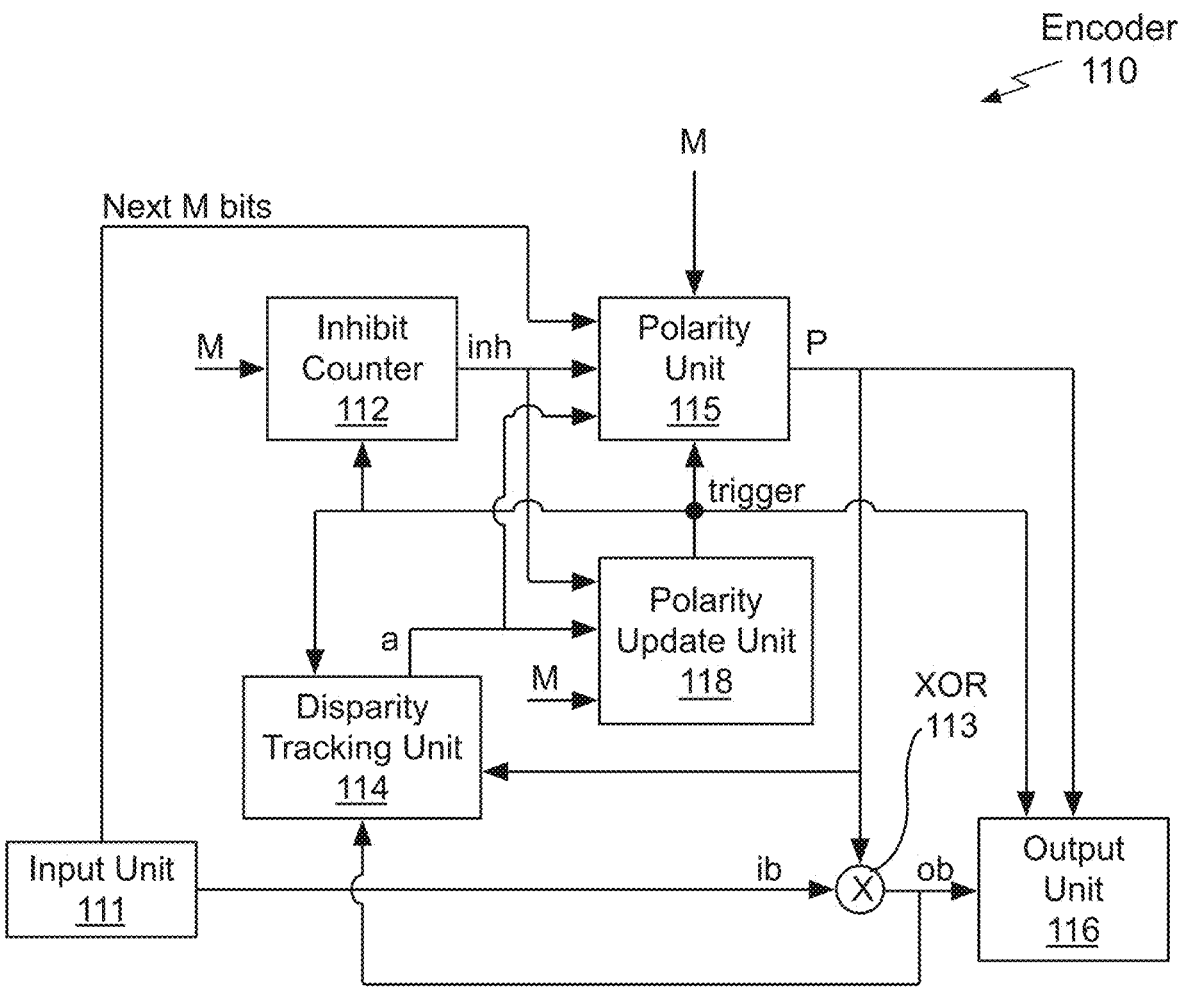
FIG. 1B illustrates a block diagram of an example dynamic bit inversion DC balanced encoder suitable for use in implementing some embodiments of the present disclosure.

FIG. 1B illustrates a block diagram of an example dynamic bit inversion DC balanced encoder 110 suitable for use in implementing some embodiments of the present disclosure. The encoder 110 comprises an input unit 111, inhibit counter 112, disparity tracking unit 114, polarity unit 114, polarity update unit 118, XOR gate 113, and output unit 116. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the encoder 110 is within the scope and spirit of embodiments of the present disclosure.

The input unit 111 receives the data stream, extracts and outputs each input bit, ib. The input unit 111 may include buffering logic to store a predetermined number of bits. The input bit is exclusive ORed (XOR) with a polarity bit p using an XOR 113 logic gate to produce an encoded output bit, ob. The output unit 116 transmits each encoded output bit in an encoded output data stream and, when a trigger signal is asserted, the output unit 116 inserts a polarity bit into the encoded output data stream to produce the encoded data stream.

The disparity tracking unit 114 receives the encoded output bits and computes the accumulated disparity a for each encoded output bit as $a_i = a_{i-1} + (ob_i?1:-1)$. The inhibit counter 112 computes an inhibit count, inh that is provided to the polarity unit 115 for generation of the polarity bit. The values inh, a, and p are initialized before the first input bit is encoded. In an embodiment, inh, a, and p are each initialized to zero. In an embodiment, p=0 corresponds to a positive polarity and p=1 corresponds to a negative polarity.

The inhibit counter 112 is needed because the disparity may remain above M during a portion of the M bits following a toggled polarity. However, the disparity is guaranteed to be reduced after the next M bits are encoded. Hence another polarity toggling should not be triggered until at least M bits have been encoded following the previous toggled polarity. Therefore, the input unit 111 provides the next M input bits to the polarity unit 115 for the lookahead feature. The polarity update unit 118 receives the accumulated disparity a, inh, and M that are needed to determine a trigger signal that is used to compute inh, compute a, and update p. In an embodiment, the polarity update unit 118 computes the trigger signal as $trig_i=((a_i>=M)$ && $(inh_i==0))$. When a is equal or greater than M and inh equals zero, the trigger is asserted. The trigger signal, $trig_i$, indicates that the polarity signal should be updated because the disparity has reached the limit, M, and it has been more than M bits since the last update. The inhibit count inh is set to M when the trigger is asserted and is otherwise set to a maximum of zero and one less than the previous inh. In an embodiment, inh is computed by the inhibit counter 112 as $inh_i=trig_i?M:max(0, inh_{i-1}-1)$. The accumulated disparity a is computed using p instead of ob when the trigger is asserted.

When the trigger signal is asserted, a new polarity is computed by scanning the next M bits to compute a lookahead disparity am and determining the polarity that will adjust the accumulated disparity closer to zero based on the lookahead disparity. In an embodiment, the calculation computeP is:

$$am = disparity \left( ib_{i+1}, \dots, ib_{i+M} \right);$$

$$if \ (a_i > 0)$$

$$if \ (am > 0)p = 1; else \ p = 0;$$

$$else$$

$$if \ (am > 0)p = 0; else \ p = 1;$$

In an embodiment, the polarity unit 115 updates p using the calculation $p_i=trig_{i-1}?computeP( ):p_{i-1}$. When p is updated (toggled from 0 to 1, or from 1 to 0, or held constant at 0 or 1), the output unit 116 inserts the new value of p into the encoded output data stream and the inhibit counter 112 sets inh to M, inhibiting another update of p for the next M bits. The inhibit signal, $inh_i$, inhibits assertion of the trigger signal for M bits following an update (toggling) of the polarity signal.

Two output bits are generated from an input bit, $ib_i$, corresponding to assertion of the trigger signal. First, the encoded output bit, $ob_i$, is inserted into the encoded output data stream. Then, on the next processing cycle, the updated value of the polarity, $p_{i+1}$, is inserted into the encoded output data stream. In an embodiment, flow control is implemented within the encoder 110 to avoid advancing the input data stream during the processing cycle when the polarity bit is inserted by the output unit 116 into the encoded output data stream. The operations performed by the encoder 110 are described by pseudo code shown in TABLE 1 below.

TABLE 1

| Encoder operations |
| --- |

```
a = 0 ;              // accumulated disparity
p = 0 ;              // start positive
inh = 0 ;            // inhibit counter
for each input bit, ib:
  ib = pull( )                    // pull ib from input stream
  ob = ib ^ p ;                   // output bit is true or inverted input bit
  a += ob ? 1 : −1 ;              // compute disparity
  push(ob) ;                      // push ob to output stream
  if(inh > 0) inh— ;              // decrement inhibit counter
  if((inh == 0) && (abs(a) >= M)) {   // correct
    p = compute p( ) ;            // compute p by looking ahead M
    a += p ? 1 : −1 ;             // adjust disparity for p
    push(p) ;                     // push onto output stream
    inh = M ;                     // set inhibit counter
```

Figure 1C:
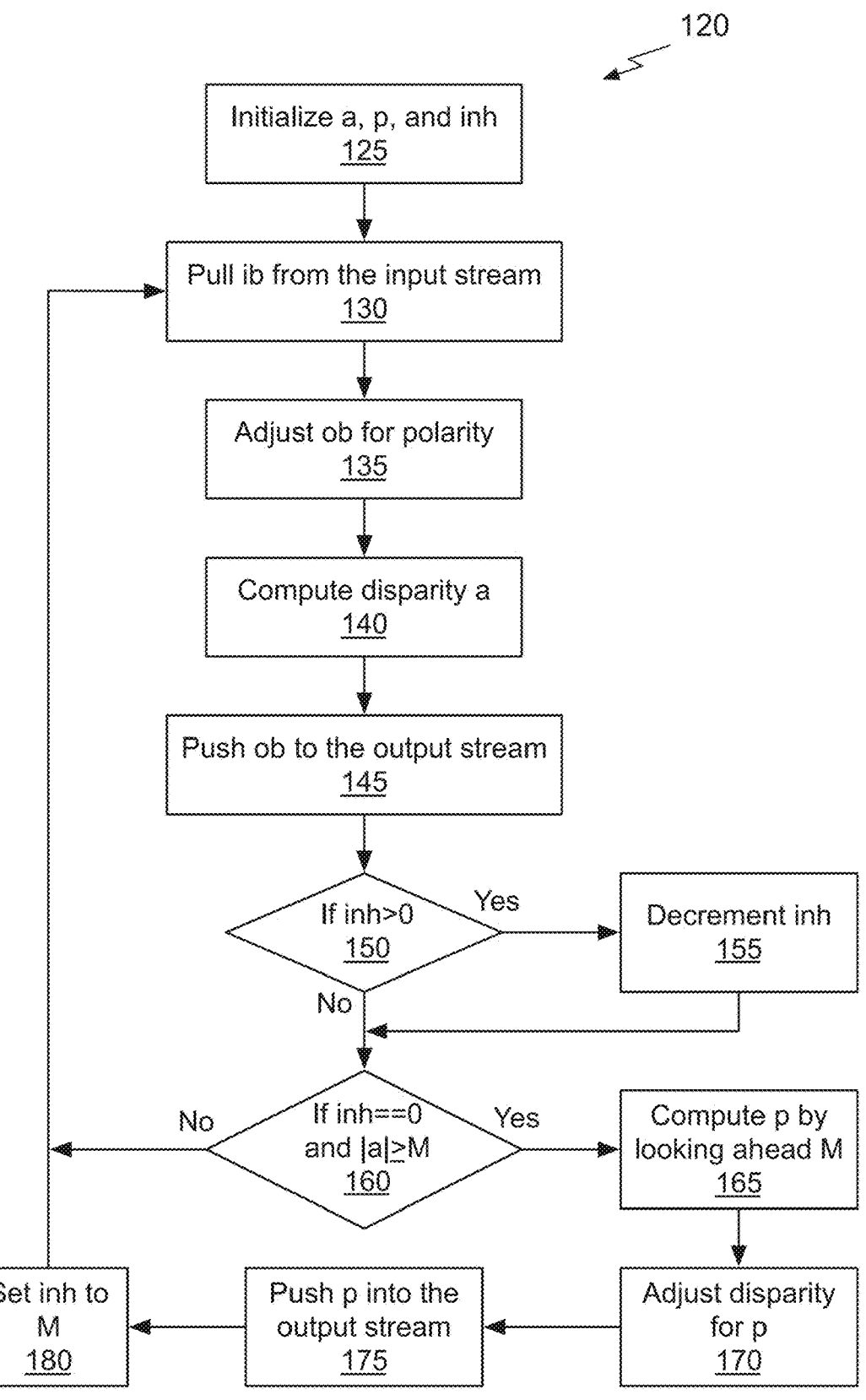
FIG. 1C illustrates a flowchart of a method for encoding a data stream, in accordance with an embodiment.

FIG. 1C illustrates a flowchart of a method 120 for encoding a data stream, in accordance with an embodiment. Each block of method 120, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 120 is described, by way of example, with respect to the encoder 110 of FIG. 1B. However, this method may additionally or alternatively be executed by any one system, or any combination of systems, including, but not limited to, those described herein. Furthermore, persons of ordinary skill in the art will understand that any system that performs method 120 is within the scope and spirit of embodiments of the present disclosure.

At step 125, the variables a, p and inh are initialized. In an embodiment, the variables are each initialized to zero. At step 130, a bit ib is pulled from the input data stream. At step 135, ob is adjusted for polarity, producing an encoded bit. In an embodiment, ob is encoded as the exclusive OR of ib and p. At step 140, the accumulated disparity a is computed. At step 145, the encoded ob is pushed to the encoded output data stream, transmitting the encoded ob through an electrical connection.

At step 150, if inh is greater than zero, inh is decremented at step 155 before proceeding to step 160. At step 160, the polarity update unit 118 asserts the trigger signal if inh equals zero and an absolute value of a is greater than or equal to M, a threshold value. When the trigger signal is asserted at step 160, p is computed by looking ahead by M bits at step 165. Otherwise, at step 160, the method returns to step 130 to encode another input bit. At step 170, the disparity a is adjusted for p. At step 175, p is pushed into the encoded output data stream. At step 180, inh is set to M before the method returns to step 130.

Figure 2A:
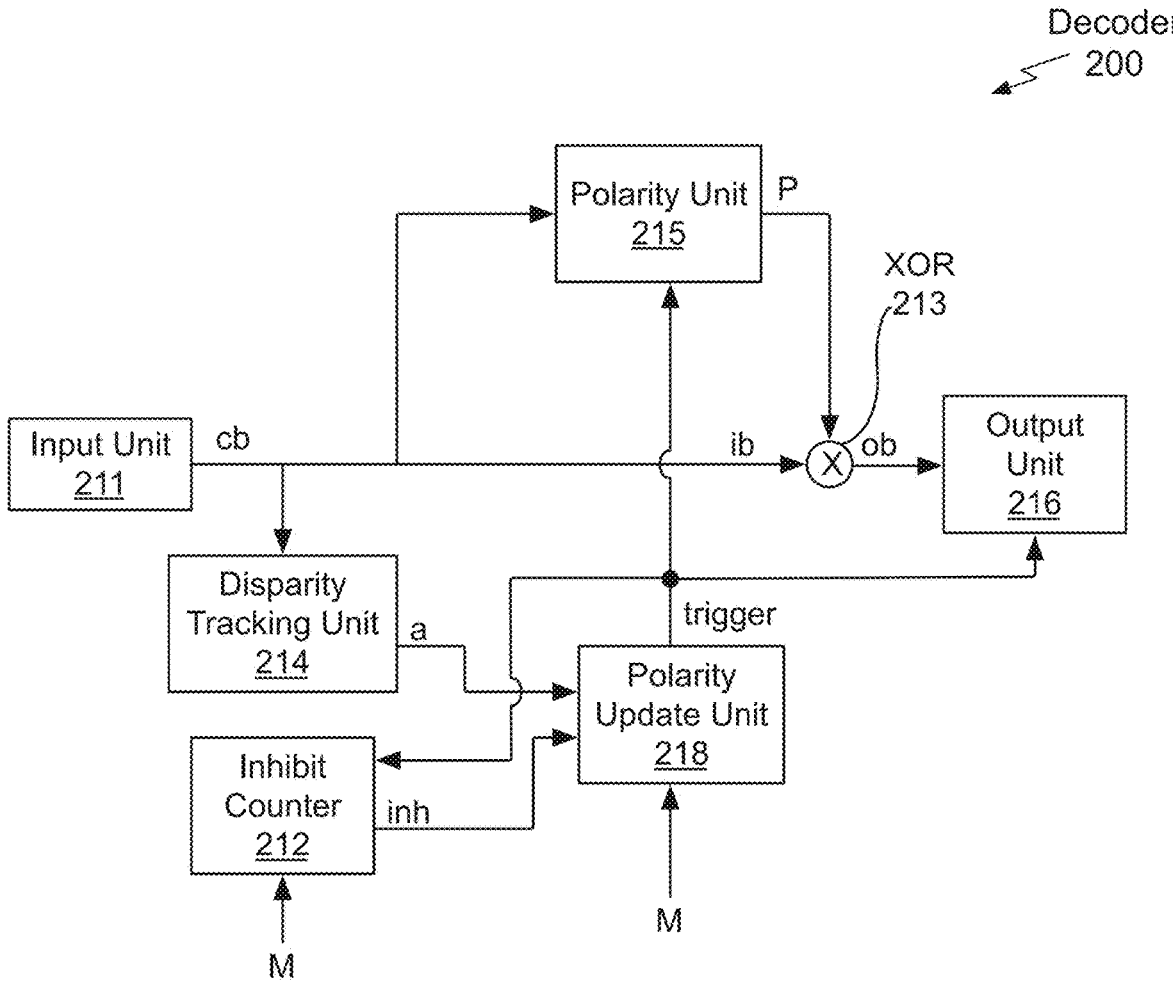
FIG. 2A illustrates a block diagram of an example dynamic bit inversion DC balanced decoder suitable for use in implementing some embodiments of the present disclosure.

FIG. 2A illustrates a block diagram of an example dynamic bit inversion DC balanced decoder 200 suitable for use in implementing some embodiments of the present disclosure. The decoder 200 comprises an input unit 211, inhibit counter 212, disparity tracking unit 214, polarity unit 215, polarity update unit 218, XOR gate 213, and output unit 216. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the decoder 200 is within the scope and spirit of embodiments of the present disclosure.

The decoder 200 consumes a bit from the transmitted encoded data stream each processing cycle. The input unit 211 receives the transmitted encoded data stream, extracts and outputs each encoded bit, cb. The input unit 211 may include buffering logic to store a predetermined number of bits. The bit cb is used to either update (replace) the p bit or is XOR-ed with the p bit by the XOR 213 logic gate to produce a decoded output bit ob that is provided to the output unit.

The disparity tracking unit 214 receives the encoded bits cb and, when the trigger signal is negated, computes the accumulated disparity a for each encoded bit as $a_i = a_{i-1} + (cb_i ? 1 : -1)$. Because the encoded data stream includes the polarity bits, the disparity tracking unit 214 is updated for both the data bits and the polarity bits. The inhibit counter 212 computes an inhibit count, inh that is used to control updates to the polarity bit p. Updating the polarity bit is implemented by replacing the current polarity bit with the bit cb that was extracted from the encoded data stream. The values inh, a, and p are initialized before the first encoded bit is received. In an embodiment, inh, a, and p are each initialized to zero. As with the encoder 110, an update of p is triggered when the absolute value of the accumulated disparity a is greater or equal to M and the inhibit counter inh equals zero—as determined by the polarity update unit 218. In response to assertion of the polarity update trigger by the polarity update unit 218, the inhibit counter is set to M. As with the encoder 110, the decoder 200 must be able to handle a variable rate because a bit of the encoded data stream will not be decoded during processing cycles when the p bit is updated.

The polarity update unit 218 receives the accumulated disparity a and M that are needed to determine a trigger signal that is used to compute inh and update p. In an embodiment, the polarity update unit 218 computes the trigger signal as $trig_i = ((a_i >= M) \&\& (inh_i == 0))$. When a is equal or greater than M and inh equals zero, the trigger is asserted. The trigger signal, $trig_i$, indicates that the polarity signal should be updated because the disparity has reached the limit, M, and it has been more than M bits since the last update. The inhibit count inh is set to M when the trigger is asserted and is otherwise set to a maximum of zero and one less than the previous inh. In an embodiment, inh is computed by the inhibit counter 212 as $inh_i = trig_i ? M : max(0, inh_{i-1} - 1)$. The output unit 216 outputs each decoded output bit ob. The operations performed by the decoder 200 are described by pseudo code shown in TABLE 2 below.

TABLE 2

| Decoder operations |
| --- |

```
a = 0 ;                              // accumulated disparity
p = 0 ;                              // start positive
inh = 0 ;                            // inhibit counter
for each coded bit, cb:
    if((inh == 0) && (abs(a) >= M)) {    // next bit is a p bit
        p = pull( ) ;                    // get p from bit stream
        a += p ? 1 : -1 ;                // adjust disparity
        inh = M ;                        // set inhibit counter
    } else {                             // data bit
        cb = pull( ) ;                   // pull cb from stream
        ob = p ^ cb ;                    // invert as needed
        push(ob) ;                       // push to output stream
        a += cb ? 1 : -1 ;               // adjust disparity
        if(inh > 0) inh-- ;              // decrement inhibit counter
    }
```

Figure 2B:
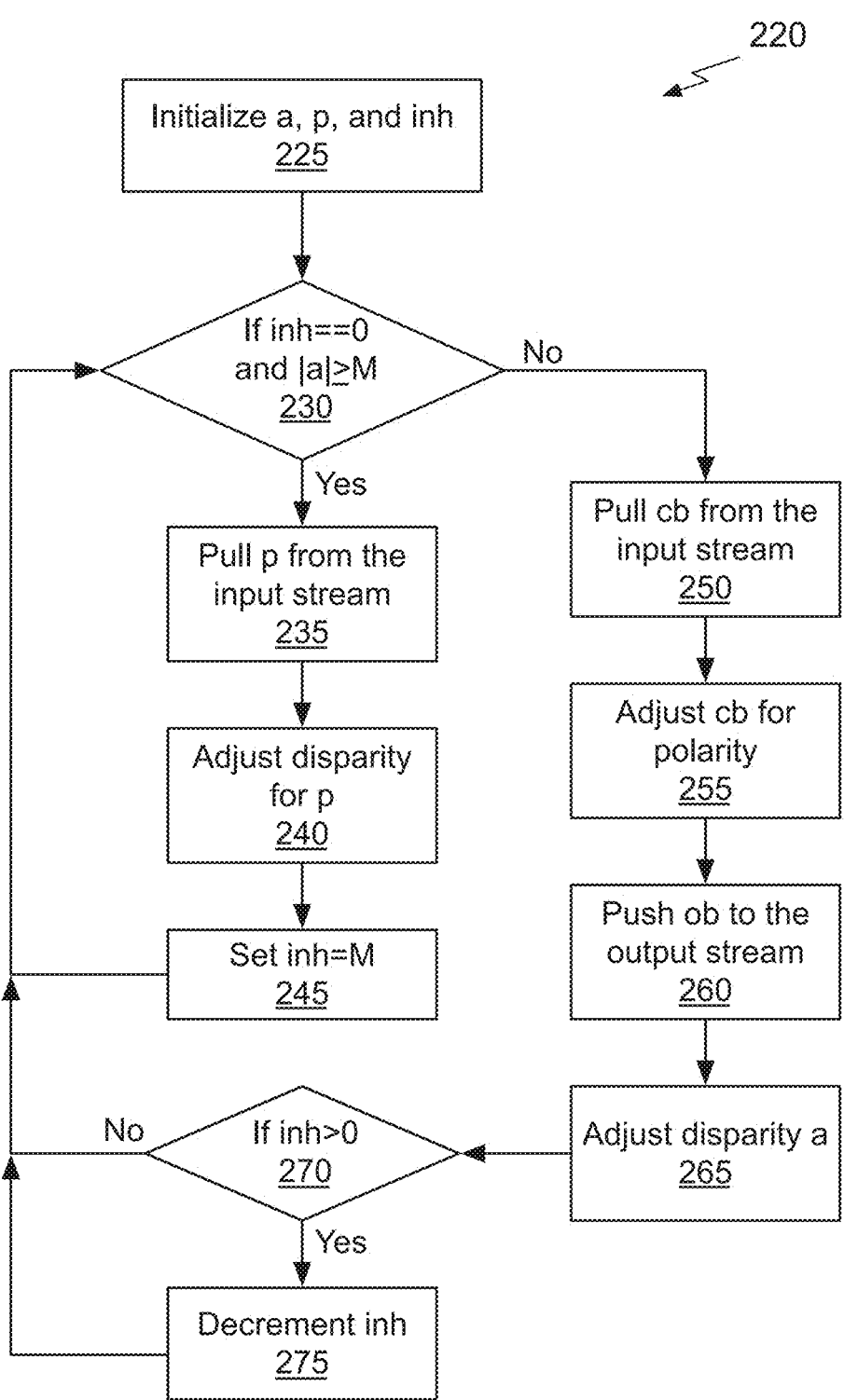
FIG. 2B illustrates a flowchart of a method for decoding an encoded data stream, in accordance with an embodiment.

FIG. 2B illustrates a flowchart of a method 220 for decoding an encoded data stream, in accordance with an embodiment. Each block of method 220, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 220 is described, by way of example, with respect to the decoder 200 of FIG. 2B. However, this method may additionally or alternatively be executed by any one system, or any combination of systems, including, but not limited to, those described herein. Furthermore, persons of ordinary skill in the art will understand that any system that performs method 220 is within the scope and spirit of embodiments of the present disclosure.

At step 225, the variables a, p and inh are initialized. In an embodiment, the variables are each initialized to zero. At step 230, the polarity update unit 218 asserts the trigger signal if inh equals zero and an absolute value of a is greater than or equal to M, a threshold value. When the trigger signal is asserted at step 230, p is updated with the bit pulled (extracted) from the encoded data stream at step 235. At step 240, the disparity a is adjusted for p. At step 245, inh is set to M before the method returns to step 230.

When the trigger signal is not asserted at step 230, the method proceeds to step 250 and pulls an encoded bit, cb from the encoded data stream. At step 255, cb is adjusted for polarity, producing a decoded bit ob. In an embodiment, cb is decoded as the exclusive OR of cb and p. At step 260, the decoded bit ob is pushed to the decoded output data stream by the output unit 216. At step 265, the accumulated disparity a is adjusted before proceeding to step 270. At step 270, if inh is greater than zero, inh is decremented at step 275 before returning to step 230. If, at step 270 inh is not greater than zero, the method returns to step 230.

If the input data stream and/or encoded output data stream operates at a high bit rate, greater than the clock rate, multiple bits of output must be encoded or decoded per processing cycle. This is accomplished by unrolling the computation of a, inh, trig, p, and out combinationally. In an embodiment, multiple bits of the data stream are encoded and/or decoded each processing cycle. The encoder 120 calculates disparity, inhibit, and trigger values for each bit and when the trigger signal is asserted, the inhibit value is updated and the polarity bit is calculated and updated.

Figure 3A:
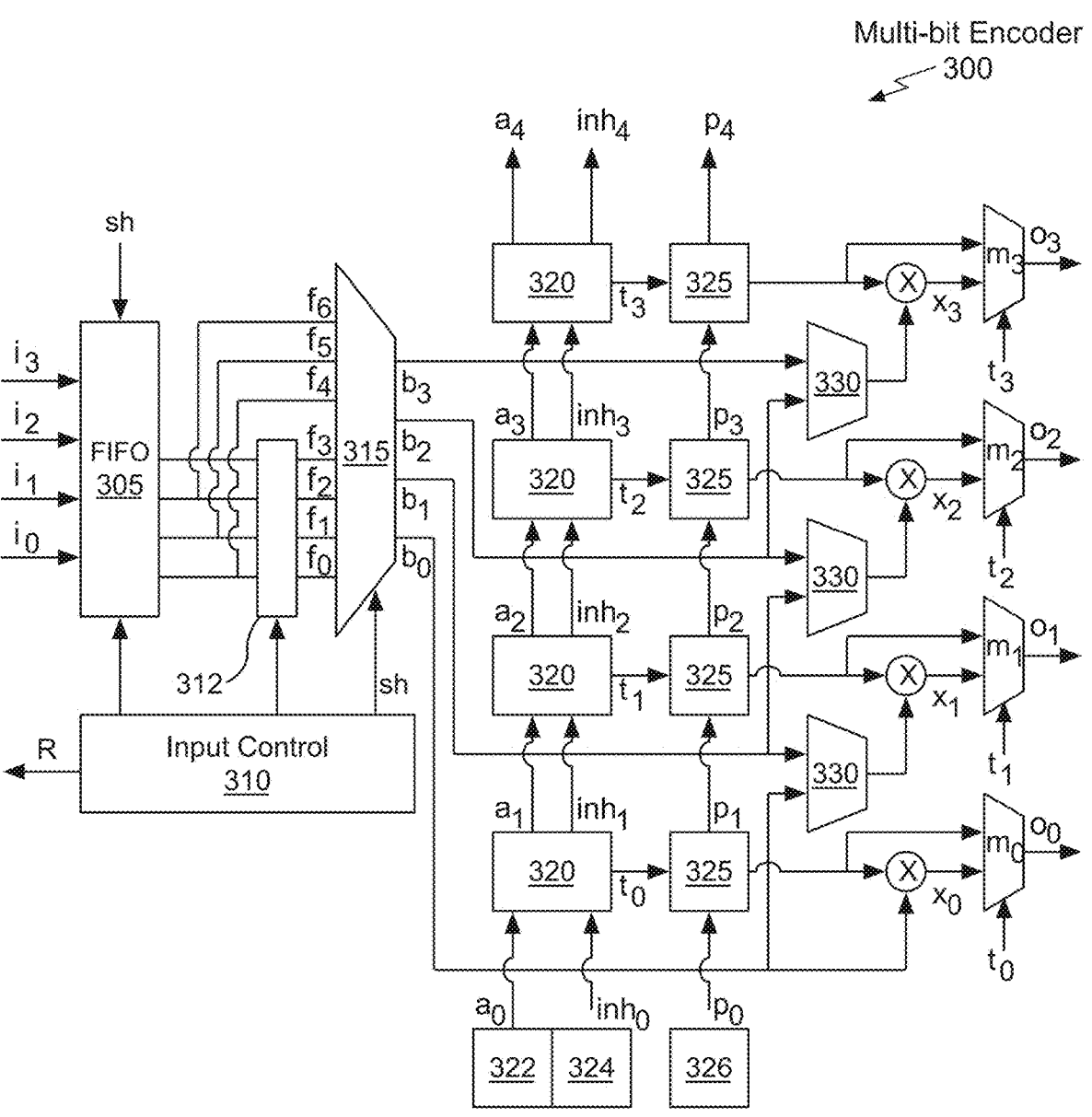
FIG. 3A illustrates a block diagram of an example multi-bit dynamic bit inversion DC balanced encoder, in accordance with an embodiment.

FIG. 3A illustrates a block diagram of an example multi-bit dynamic bit inversion DC balanced encoder 300, in accordance with an embodiment. The multi-bit encoder 300 comprises a FIFO 305, input control 310, register 312, funnel shifter 315, trigger units 320, polarity units 325, registers 322, 324, and 326, multiplexers 330, XOR gates, and multiplexers $m_0$, $m_1$, $m_2$, and $m_3$.

The multi-bit encoder 300 outputs four bits, $o_0$, $o_1$, $o_2$, and $o_3$ per cycle by unrolling the logic of the encoder 120 four times in space. The starting value of counters a and inh and the current value of p are held in registers 322, 324, and 326, respectively. The trigger unit 320 updates a and inh for the first input bit, $b_0$, producing $a_1$ and $inh_1$. The trigger unit 320 also asserts trigger, to when the polarity p must be updated. The trigger unit 320 calculation of a, inh, and trigger (trig) is as follows:

$$a_i = a_{i-1} + (o_i \ ? \ 1 : -1);$$

$$inh_i = trig_i \ ? \ M : \max(0, inh_{i-1} - 1);$$

$$trig_i = ((a_i >= M) \ \&\& \ (inh_i == 0));$$

Note that $a_i$ depends on the value of the corresponding output bit $o_i$. Wires connecting $o_i$ to the trigger units 320 are omitted in FIG. 3A.

The polarity units 325 hold the current values of $p_i$ and each update $p_i$ when the corresponding trigger $t_i$ is asserted. The polarity units 325 calculation of p is as follows:

$$p_i = trig_{i-1} \ ? \ \text{computeP}() : p_{i-1};$$

The function, computeP( ) examines the next M bits in the FIFO 305. Wires providing the next M bits to each of the polarity units 325 are omitted in FIG. 3A.

The updated polarity bit is used to encode each bit $b_0$-$b_3$ following assertion of the corresponding trigger signal. The FIFO 305 and funnel shifter 315 may be used to process the multiple bits and allow insertion of the updated polarity as needed. The current polarity, $p_i$ is XORed with the current input to generate output $o_i$, unless $t_i$ is asserted, in which case the updated $p_i$ is output by the polarity unit 325. Multiplexers $m_0$, $m_1$, $m_2$, and $m_3$ perform the selection between the current and new polarity. Each of the multiplexers $m_0$, $m_1$, $m_2$, and $m_3$ selects the polarity output by the corresponding polarity unit 325 when the respective trigger is asserted.

When $t_i$ is asserted, the current and remaining bits are shifted by the multiplexers 330 so that every input bit b is output. Each of the multiplexers 330 selects its lower input if any of the trigger signals at the same or lower bit position is asserted. The multiplexer 330 receiving $b_0$ and $b_1$ selects $b_0$ if to is asserted (true). The multiplexer 330 receiving $b_1$ and $b_2$ selects $b_1$ if $t_0$ or $t_1$ is asserted, and the multiplexer 330 receiving $b_2$ and $b_3$ selects $b_2$ if any of $t_0$, $t_1$, or $t_2$ is asserted.

The input FIFO 305 and funnel shifter 315 present the next 4 bits $b_0$-$b_3$ to be processed to the encoding logic. The funnel shifter 315 takes 4 bits, $f_0$-$f_3$, from the last stage of the FIFO (shown as the separate register 312) along with three bits from the second to last stage of the FIFO 305, $f_4$-$f_6$. After reset, a shift input to the funnel shifter 305, sh, is zero selecting $f_0$-$f_3$ to as inputs $b_0$-$b_3$. Each processing cycle, if no trigger is asserted, all four bits $b_0$-$b_3$ are consumed, sh holds its previous value, the FIFO 305 is shifted, and the ready, R, output of the input control 310 is asserted to accept the next 4 bits, $i_0$, $i_1$, $i_2$, and $i_3$ of input.

If a trigger is asserted, then only 3 bits of the input have been consumed. In this case, sh is incremented by 3 (mod 4). If the value of sh wraps, then the FIFO 305 is shifted and R is asserted to get the next four bits. For example, if sh is 0, incrementing by 3 gives sh=3. In this case the FIFO 305 is not shifted and bits $f_3$-$f_6$ are input as $b_0$-$b_3$ during the next cycle. The next time a trigger is asserted incrementing by 3 gives 3+3=6=2 (mod 4). Because the counter "wrapped", the FIFO 305 is shifted and bits $f_2$-$f_5$ of the shifted values are input as $b_0$-$b_3$ during the next cycle. The FIFO 305 also serves to provide an M-bit look ahead for the computeP( ) function. The look ahead is different for each bit and also depends on the shift value.

Figure 3B:
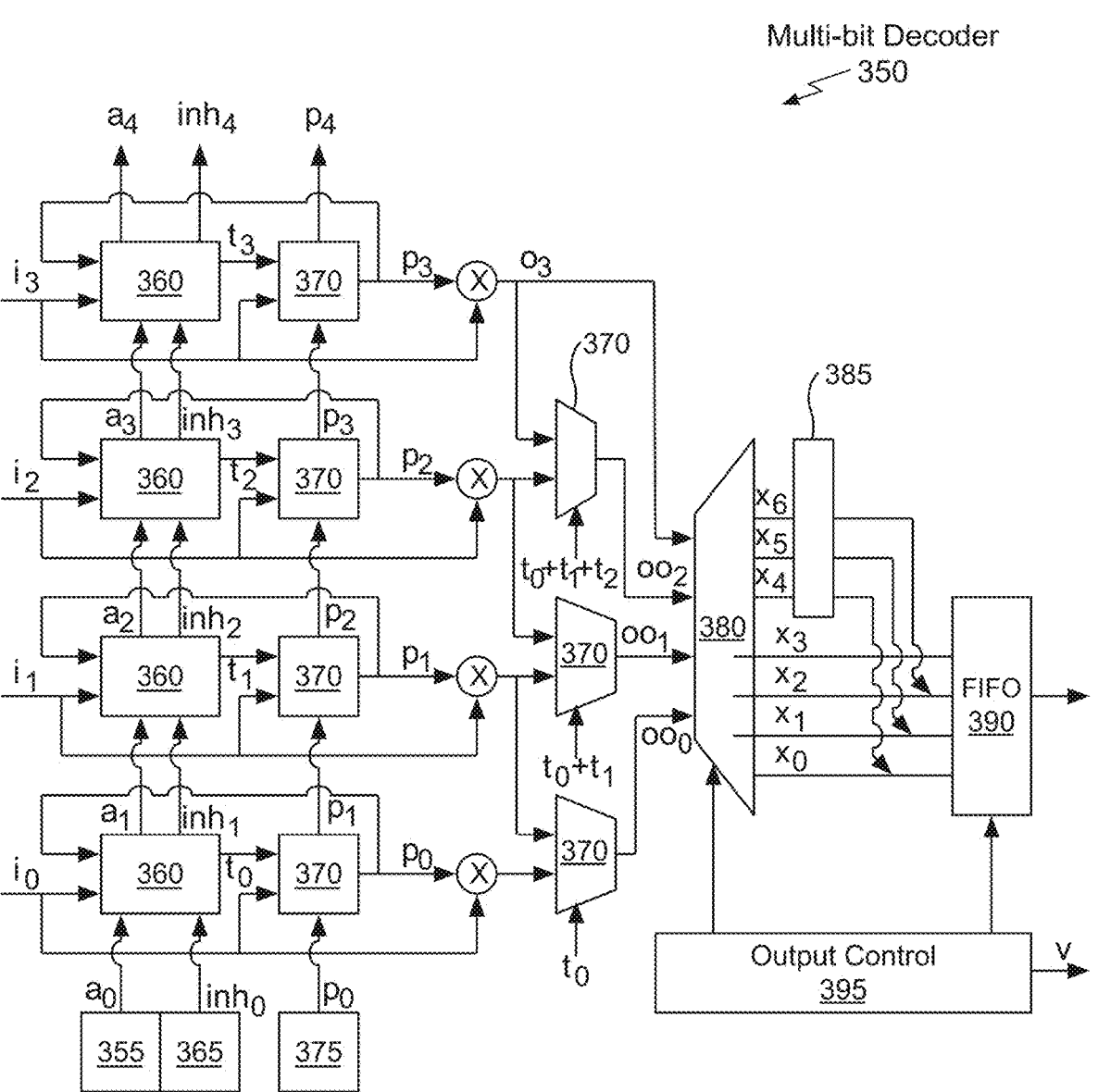
FIG. 3B illustrates a block diagram of an example multi-bit dynamic bit inversion DC balanced decoder, in accordance with an embodiment.

FIG. 3B illustrates a block diagram of an example multi-bit dynamic bit inversion DC balanced decoder 350, in accordance with an embodiment. The multi-bit decoder 350 comprises a FIFO 390, output control 395, register 385, shifter 380, trigger units 360, polarity units 370, registers 355, 365, and 375, multiplexers 370, and XOR gates. The multi-bit decoder 350 operates in a similar manner to the encoder as shown in the figure above for a 4-bit per cycle implementation, calculating disparity, inhibit, and trigger values for each encoded bit and when a trigger signal is asserted, the inhibit value is updated and the polarity bit is calculated and updated. The updated polarity bit is used to decode each bit following the trigger bit. The shifter 380 and FIFO 390 may be used to process the multiple decoded bits and allow extraction of the polarity as needed.

Four encoded input bits $i_0$-$i_3$ are input to the trigger units 360 that calculate the accumulator (a) and inhibit (inh) counters and the trigger signals, $t_i$, in the same manner as the multi-bit encoder 300. The polarity units 370 may each be implemented as a multiplexer. If $t_i$ is true, $p_i$=$i_i$, otherwise $p_i$=$p_{i-1}$. Registers 355, 365, and 375 capture $a_4$, $inh_4$, and $p_4$, respectively, at the end of each processing cycle and present $a_4$, $inh_4$, and $p_4$ as $a_0$, $inh_0$, and $p_0$, respectively, at the start of the next processing cycle.

If any of the trigger signals are asserted, only three decoded bits are output for the processing cycle. The bit associated with the asserted trigger signal is the new polarity (p) bit and not a data bit. The three 2:1 multiplexers 370 shift the decoded data bits so they are in the low three bit positions. The $oo_0$ multiplexer 370 selects the decoded bit in if to is true. The $oo_1$ multiplexer 370 selects the decoded bit $i_2$ if to or $t_1$ is true, and the $oo_2$ multiplexer 370 selects the decoded bit $i_3$ if $t_0$, $t_1$, or $t_2$ is true.

Because either 3 or 4 bits can be produced per processing cycle, the shifter 380 is needed to align the output ($x_i$) bits for input to the FIFO 390. Initially the shift value is zero, so $oo_0$-$oo_3$ are output on $x_0$-$x_3$. If four bits are produced, the shift value remains unchanged, and the FIFO 390 accepts the four bits as input. If any of the trigger bits, $t_i$, are asserted, only three bits are produced. When one of the trigger bits is asserted, the shift count is incremented by 3 (mod 4) giving a value of 3. On the next processing cycle $oo_0$-$oo_3$ are output on $x_3$-$x_6$. Only the bits of the FIFO 390 associated with valid decoded bits (not polarity bits) are updated. Bit enables (not shown) are generated by the output control 395 for this purpose. Bit $x_3$ is input to the high bit of the FIFO 390 and bits $x_4$-$x_6$ are written to the extension register 385. If four bits are produced on the next cycle the same occurs, but in addition the FIFO 390 is advanced and the contents of the extension register 385 are written into the low three input bits of the FIFO 390—so bits $x_4$-$x_6$ appear in the FIFO 390 before the new value of $x_3$. If on the next processing cycle another three bits are produced, the shift count is again incremented by 3 (mod 4) giving a value of 2. In this case $oo_0$-$oo_3$ are output on $x_2$-$x_5$. Two bits are written to the FIFO 390 and two bits are written to the extension register 385. On the next processing cycle, the two bits stored in the extension register 385 will be written to the low two bits of the FIFO 390.

On any cycle where the shift count "wraps" (mod 4), the FIFO 390 is shifted and four bits are output. On a cycle where the shift count does not wrap (e.g., incrementing from 0 to 3) the FIFO 390 is not shifted and a "valid" output (v) of the output control 395 is deasserted (negated) to signal that no word is available for the processing cycle.

In the worst case, the encoder 110 and multi-bit encoder 300 insert a polarity (p) bit every M bits, giving a throughput of M/M+1 while in the best case, the link (electrical connection) may transmit encoded data indefinitely without having to transmit a polarity bit. Thus, the link has a data rate that may vary between M/M+1 and 1 times the bit rate. To accommodate the variability, flow control is required at higher levels of the system. Flow control is typically implemented by inserting FIFOs and employing a ready-valid protocol to meter data into the transmit FIFO and out of the receive FIFO.

FIG. 4 illustrates a flowchart of a method 400 for dynamic bit inversion DC balanced encoding, in accordance with an embodiment. Each block of method 400, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 400 is described, by way of example, with respect to the encoder 110, decoder 200, multi-bit encoder 300, and/or multi-bit decoder 350. However, this method may additionally or alternatively be executed by any one system, or any combination of systems, including, but not limited to, those described herein. Furthermore, persons of ordinary skill in the art will understand that any system that performs method 400 is within the scope and spirit of embodiments of the present disclosure.

At step 405, in response to determining a disparity between a first number of logic high bits and second number of logic low bits of a first portion of the data that has been encoded and transmitted through the electrical connection is greater than a threshold value, a polarity bit is computed. In an embodiment, the disparity is updated for each bit of the transmitted encoded data.

At step 410, the polarity bit is transmitted through the electrical connection. At step 415, a second portion of the data is encoded for transmission by performing a logic operation on bits of the second portion of the data using the polarity bit. In an embodiment, the logic operation comprises an exclusive OR. In an embodiment, encoded subsequent bits of the data are transmitted without transmitting an additional polarity bit during an inhibit period after the transmission of the polarity bit and until the disparity exceeds the threshold value.

In an embodiment, multiple bits of the data are encoded and transmitted in parallel. In an embodiment, the disparity is computed for each bit in the multiple bits to produce multiple disparity values. In an embodiment, the polarity bit is inserted into the multiple encoded bits of the data for transmission and transmission of one bit of the multiple encoded bits is delayed when the polarity bit is transmitted.

At step 420, at least the threshold value quantity of the encoded second portion of the data is transmitted before the disparity is compared with the threshold value. In an embodiment, computing the polarity bit comprises: scanning the second portion of the data to produce an additional disparity between a third number of logic high bits and a fourth number of logic low bits in the second portion; and determining a value of the polarity bit to reduce a combination of the disparity and the additional disparity.

In an embodiment, in response to determining an additional disparity between a third number of logic high bits and a fourth number of logic low bits of the transmitted encoded data is greater than the threshold value, the polarity bit is extracted from the transmitted encoded data at a receiver that is coupled to the electrical connection, a received polarity bit is updated, and subsequent encoded bits of the transmitted encoded data received after the polarity bit are decoded by performing a logic operation on the subsequent encoded bits using the received polarity bit. In an embodiment, at least the threshold value quantity of the subsequent encoded bits are received before the additional disparity is compared with the threshold value.

In an embodiment, at least one of steps 405, 410, 415, and 420 are performed on a server or in a data center to encode the data and the encoded data is streamed to a user device. In an embodiment, at least one of steps 405, 410, 415, and 420 are performed within a cloud computing environment. In an embodiment, at least one of steps 405, 410, 415, and 420 are performed on a virtual machine comprising a portion of a graphics processing unit. In an embodiment, at least one of steps 405, 410, 415, and 420 are performed for training, testing, or certifying a neural network employed in a machine, robot, or autonomous vehicle. In an embodiment, at least one of steps 405, 410, 415, and 420 are implemented to include advanced error correction, fault-tolerance, and self-healing capabilities.

The dynamic bit inversion method described here has an overhead of about ⅓ that of a fixed-overhead code on a random bit-stream. However, a worst-case bit stream has nearly the same overhead as the fixed-overhead code, and a stream of all 0s has an overhead that is about ½ that of the fixed code. Systematically high-overhead bit-streams can be avoided by first scrambling the bit stream by XORing the bit stream with a pseudo-random bit pattern. Scrambling will give an overhead of about ⅓ that of a fixed-overhead code in almost all situations.

The dynamic bit inversion method may be very sensitive to bit errors. A single bit error in the encoded bit stream will result in the location of a polarity update being incorrect and will corrupt all subsequent bits. To mitigate such errors, the dynamic bit inversion method should be layered with error correction so that the error correction takes place on the encoded bit stream. If the error correction unbalances the disparity, padding can take place to DC balance the correction. For example, suppose a Reed-Solomon block code is employed. Each block consists of the already DC balanced data block plus a number of redundant symbols. The redundant symbols can be DC balanced by employing a fixed-overhead code. An alternate approach to mitigate error propagation is to employ dynamic bit inversion on blocks of data. Each block of, e.g., 1024 bits, is independently encoded. If an error affects a block, the propagation ends at the start of the next block.

In summary, the dynamic bit inversion technique for DC balancing typically has lower overhead compared with conventional techniques. Importantly, the overhead resulting from insertion of polarity bits is only incurred when needed. For example, no overhead is incurred for a string of alternating 1s and 0s. The overhead is based on the threshold value M that can be programmed to adjust the run-length limit. Overhead of the dynamic bit inversion is about ⅓ of the overhead for conventional fixed-overhead DC balancing techniques. In the worst-case, the overhead is nearly the same. For the worst-case data streams, scrambling may be used to achieve about ⅓ of the overhead. In an embodiment error correction may be performed for the encoded data stream.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
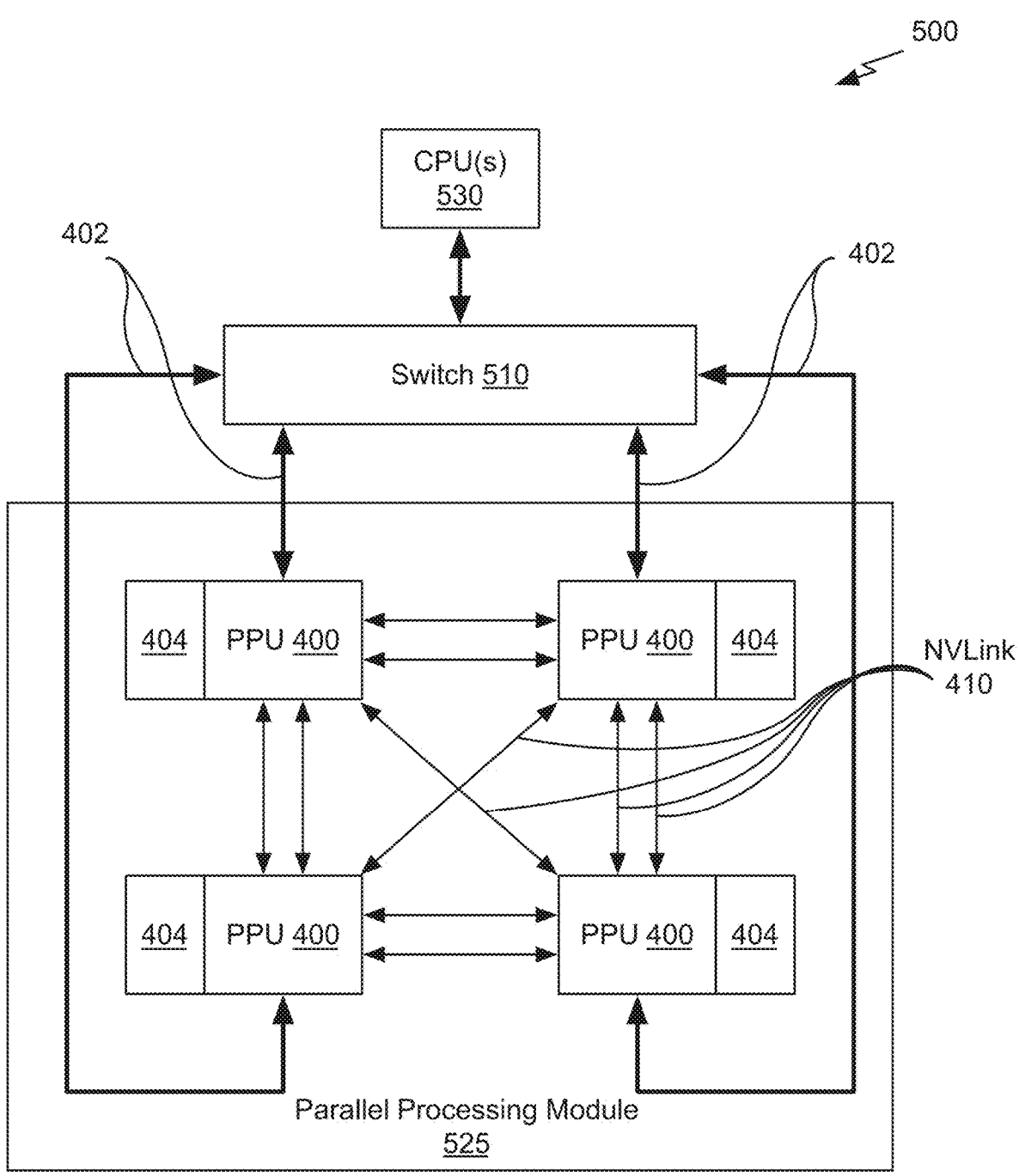
FIG. 5A is a conceptual diagram of a processing system, suitable for use in implementing some embodiments of the present disclosure.

FIG. 5A is a conceptual diagram of a processing system 500 implemented using the PPU 400 of FIG. 4, in accordance with an embodiment. The exemplary system 500 may be configured to implement one or more of the methods 120, 200, and 400 shown in FIGS. 1C, 2B, and 4, respectively. The processing system 500 includes a CPU 530, switch 510, and multiple PPUs 400, and respective memories 404. One or more of the communication links, such as NVLink 410 may be configured to implement the dynamic bit inversion technique.

Each parallel processing unit (PPU) 400 may include hundreds or thousands of cores that are capable of handling hundreds or thousands of software threads simultaneously. The PPUs 400 may generate pixel data for output images in response to rendering commands (e.g., rendering commands from the CPU(s) 530 received via a host interface). The PPUs 400 may include graphics memory, such as display memory, for storing pixel data or any other suitable data, such as GPGPU data. The display memory may be included as part of the memory 404. The PPUs 400 may include two or more GPUs operating in parallel (e.g., via a link). The link may directly connect the GPUs (e.g., using NVLINK 410) or may connect the GPUs through a switch (e.g., using switch 510). When combined together, each PPU 400 may generate pixel data or GPGPU data for different portions of an output or for different outputs (e.g., a first PPU for a first image and a second PPU for a second image). Each PPU 400 may include its own memory 404, or may share memory with other PPUs 400.

The PPUs 400 may each include, and/or be configured to perform functions of, one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Trec Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

Figure 5B:
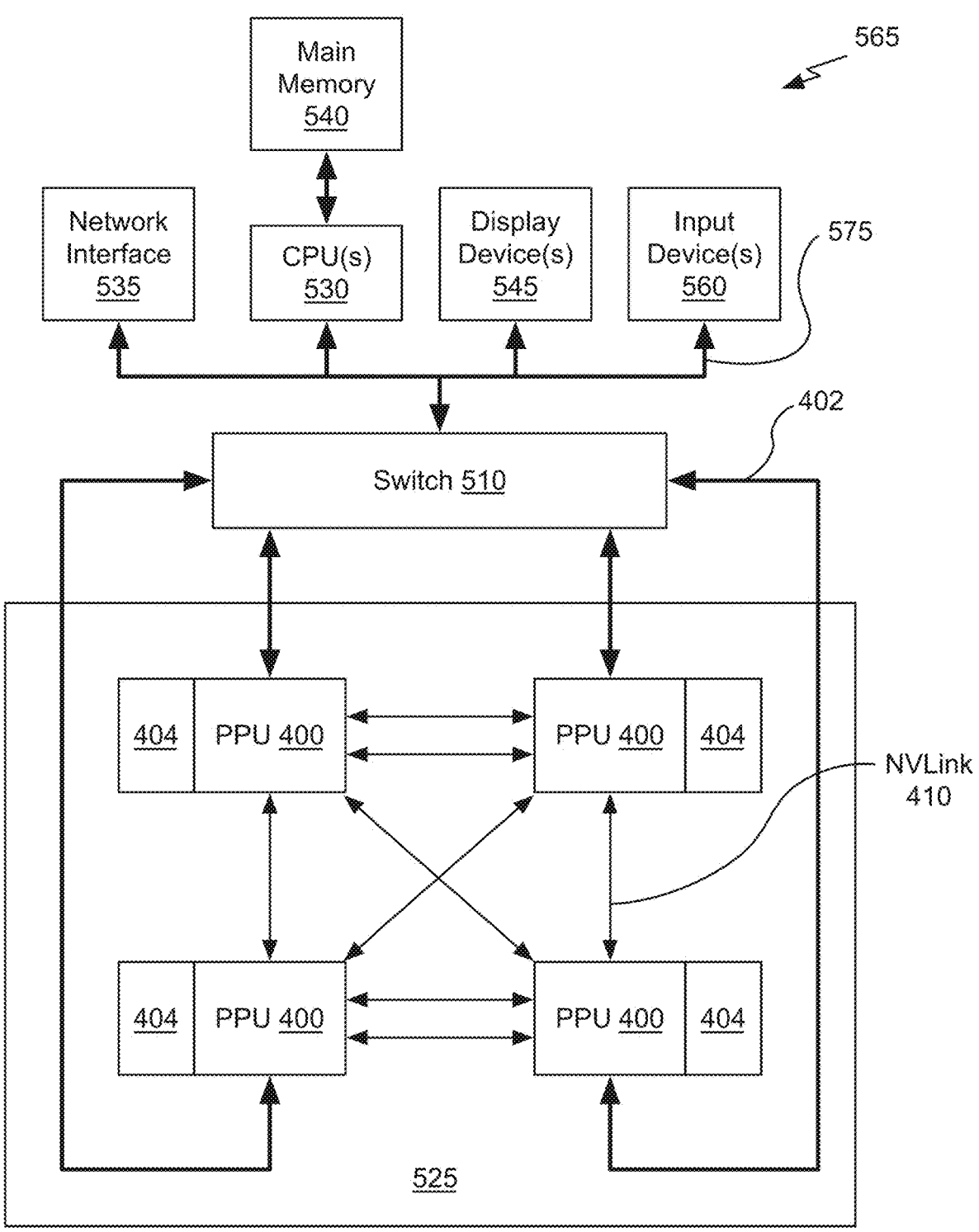
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement one or more of the methods 120, 200, and 400 shown in FIGS. 1C, 2B, and 4, respectively.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Although the various blocks of FIG. 5B are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5B is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5B.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components.

The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may be implemented as a network interface controller (NIC) that includes one or more data processing units (DPUs) to perform operations such as (for example and without limitation) packet parsing and accelerating network processing and communication. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5A and/or exemplary system 565 of FIG. 5B. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron is the most basic model of a neural network. In one example, a neuron may receive one or more inputs that represent various features of an object that the neuron is being trained to recognize and classify, and each of these features is assigned a certain weight based on the importance of that feature in defining the shape of an object.

A deep neural network (DNN) model includes multiple layers of many connected nodes (e.g., neurons, perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Figure 5C:
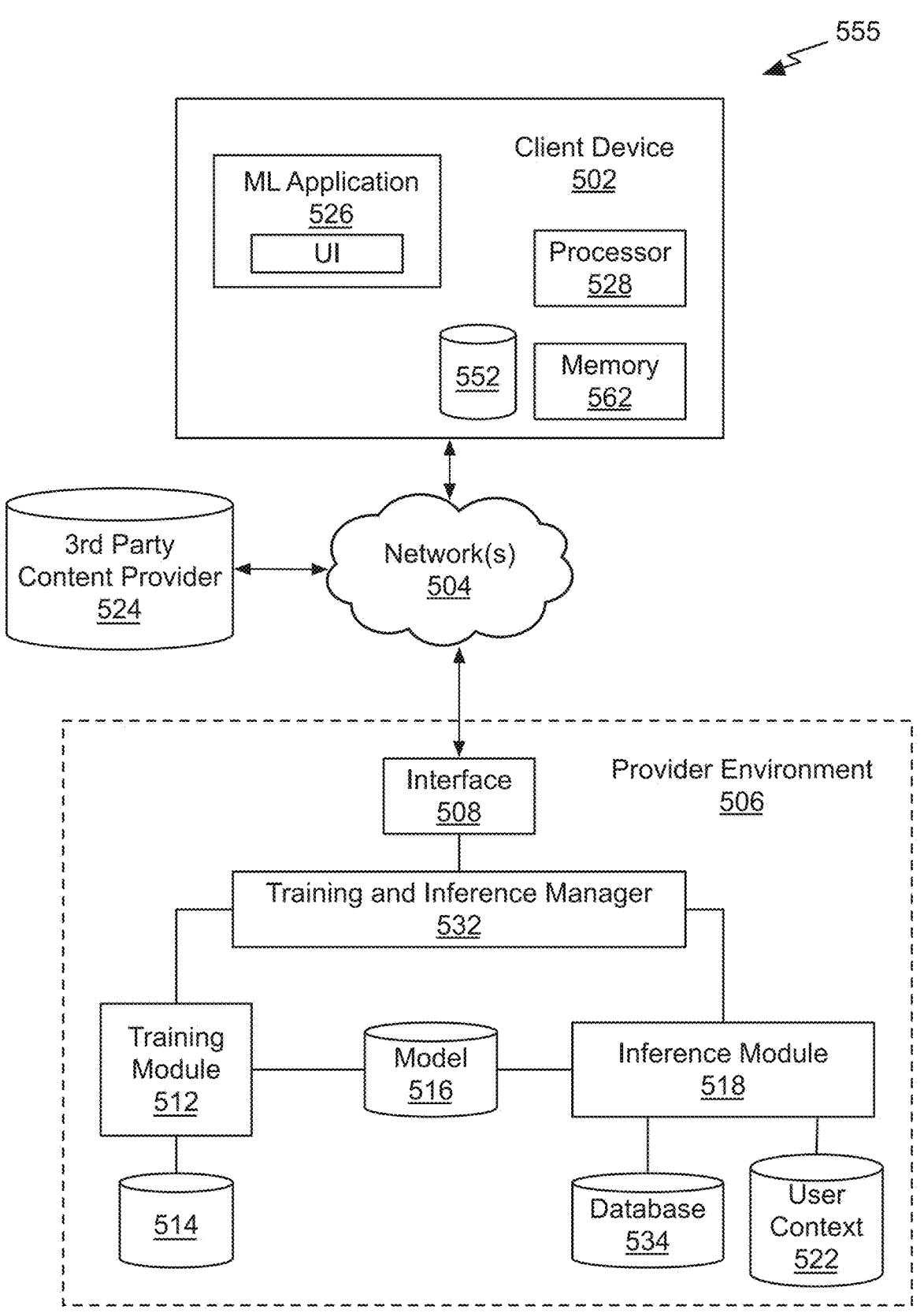
FIG. 5C illustrates components of an exemplary system that can be used to train and utilize machine learning, in at least one embodiment.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 400 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Graphics Processing Pipeline

In an embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the processing units within the PPU 400 including one or more of a vertex shader, hull shader, domain shader, geometry shader, and a pixel shader. For example, one or more of the processing units may be configured to execute a vertex shader program that processes a number of vertices defined by the model data. In an embodiment, the different processing units may be configured to execute different shader programs concurrently. For example, a first subset of processing units may be configured to execute a vertex shader program while a second subset of processing units may be configured to execute a pixel shader program. The first subset of processing units processes vertex data to produce processed vertex data and writes the processed vertex data to the L2 cache and/or the memory 404. After the processed vertex data is rasterized (e.g., transformed from three-dimensional data into two-dimensional data in screen space) to produce fragment data, the second subset of processing units executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

A graphics processing pipeline may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 400. The API provides an abstraction for a programmer that lets a programmer utilize specialized graphics hardware, such as the PPU 400, to generate the graphical data without requiring the programmer to utilize the specific instruction set for the PPU 400. The application may include an API call that is routed to the device driver for the PPU 400. The device driver interprets the API call and performs various operations to respond to the API call. In some instances, the device driver may perform operations by executing instructions on the CPU. In other instances, the device driver may perform operations, at least in part, by launching operations on the PPU 400 utilizing an input/output interface between the CPU and the PPU 400. In an embodiment, the device driver is configured to implement the graphics processing pipeline utilizing the hardware of the PPU 400.

Various programs may be executed within the PPU 400 in order to implement the various stages of the graphics processing pipeline. For example, the device driver may launch a kernel on the PPU 400 to perform a vertex shading stage on one processing unit (or multiple processing units). The device driver (or the initial kernel executed by the PPU 400) may also launch other kernels on the PPU 400 to perform other stages of the graphics processing pipeline, such as a geometry shading stage and a fragment shading stage. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on a processing unit.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA Geforce Now (GFN), Google Stadia, and the like.

Example Streaming System

Figure 6:
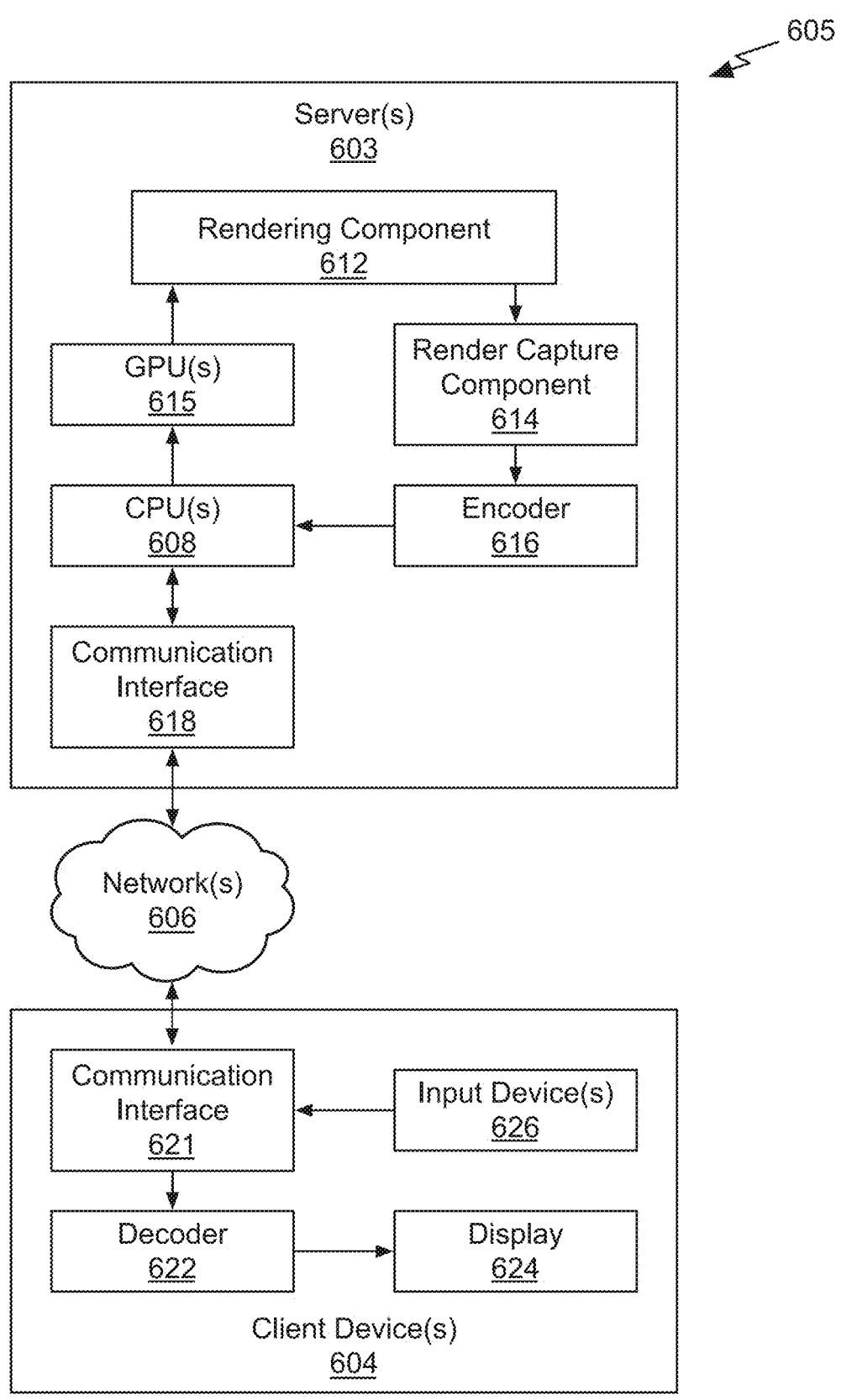
FIG. 6 illustrates an exemplary streaming system suitable for use in implementing some embodiments of the present disclosure.

FIG. 6 is an example system diagram for a streaming system 605, in accordance with some embodiments of the present disclosure. FIG. 6 includes server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In an embodiment, the streaming system 605 is a game streaming system and the server(s) 603 are game server(s). In the system 605, for a game session, the client device(s) 604 may only receive input data in response to inputs to the input device(s) 626, transmit the input data to the server(s) 603, receive encoded display data from the server(s) 603, and display the display data on the display 624. As such, the more computationally intense computing and processing is offloaded to the server(s) 603 (e.g., rendering—in particular ray or path tracing—for graphical output of the game session is executed by the GPU(s) 615 of the server(s) 603). In other words, the game session is streamed to the client device(s) 604 from the server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the server(s) 603. The client device 604 may receive an input to one of the input device(s) 626 and generate input data in response. The client device 604 may transmit the input data to the server(s) 603 via the communication interface 621 and over the network(s) 606 (e.g., the Internet), and the server(s) 603 may receive the input data via the communication interface 618. The CPU(s) 608 may receive the input data, process the input data, and transmit data to the GPU(s) 615 that causes the GPU(s) 615 to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units-such as GPUs, which may further employ the use of one or more dedicated hardware accelerators or processing cores to perform ray or path-tracing techniques—of the server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A method of encoding data for transmission through an electrical connection, comprising:

in response to determining a disparity between a first number of logic high bits and second number of logic low bits of a first portion of the data that has been encoded and transmitted through the electrical connection is greater than a threshold value, computing a polarity bit;

transmitting the polarity bit through the electrical connection;

encoding a second portion of the data for transmission by performing a logic operation on bits of the second portion of the data using the polarity bit; and transmitting at least the threshold value quantity of the encoded second portion of the data before comparing the disparity with the threshold value.

2. The method of claim 1, further comprising updating the disparity for each bit of the transmitted encoded data.

3. The method of claim 1, further comprising continuing to transmit encoded subsequent bits of the data without transmitting an additional polarity bit during an inhibit period after the transmission of the polarity bit and until the disparity exceeds the threshold value.

4. The method of claim 1, wherein the logic operation comprises an exclusive OR.

5. The method of claim 1, wherein computing the polarity bit comprises:

scanning the second portion of the data to produce an additional disparity between a third number of logic high bits and a fourth number of logic low bits in the second portion; and determining a value of the polarity bit to reduce a combination of the disparity and the additional disparity.

6. The method of claim 1, further comprising:

in response to determining an additional disparity between a third number of logic high bits and a fourth number of logic low bits of the transmitted encoded data is greater than the threshold value, extracting the polarity bit from the transmitted encoded data at a receiver that is coupled to the electrical connection;

updating a received polarity bit; and decoding subsequent encoded bits of the transmitted encoded data received after the polarity bit by performing a logic operation on the subsequent encoded bits using the received polarity bit.

7. The method of claim 6, further comprising receiving at least the threshold value quantity of the subsequent encoded bits before comparing the additional disparity with the threshold value.

8. The method of claim 1, wherein multiple bits of the data are encoded and transmitted in parallel.

9. The method of claim 8, wherein the disparity is computed for each bit in the multiple bits to produce multiple disparity values.

10. The method of claim 8, wherein the polarity bit is inserted into the multiple encoded bits of the data for transmission and transmission of one bit of the multiple encoded bits is delayed when the polarity bit is transmitted.

11. The method of claim 8, further comprising:

receiving the multiple bits of the encoded data at a decoder; and decoding the multiple bits of the encoded data in parallel by the decoder.

12. The method of claim 1, further comprising scrambling the data before the data is encoded.

13. The method of claim 1, wherein at least one of the steps of computing the polarity bit, transmitting the polarity bit, encoding, and transmitting at least the threshold value quantity of the encoded second portion of the data are performed on a server or in a data center to encode the data and the encoded data is streamed to a user device.

14. The method of claim 1, wherein at least one of the steps of computing the polarity bit, transmitting the polarity bit, encoding, and transmitting at least the threshold value quantity of the encoded second portion of the data are performed within a cloud computing environment.

15. The method of claim 1, wherein at least one of the steps of computing the polarity bit, transmitting the polarity bit, encoding, and transmitting at least the threshold value quantity of the encoded second portion of the data are performed for training, testing, or certifying a neural network employed in a machine, robot, or autonomous vehicle.

16. The method of claim 1, wherein at least one of the steps of computing the polarity bit, transmitting the polarity bit, encoding, and transmitting at least the threshold value quantity of the encoded second portion of the data are performed on a virtual machine comprising a portion of a graphics processing unit.

17. The method of claim 1, wherein at least one of the steps of computing the polarity bit, transmitting the polarity bit, encoding, and transmitting at least the threshold value quantity of the encoded second portion of the data are implemented to include advanced error correction, fault-tolerance, and self-healing capabilities.

18. A system for encoding data for transmission through an electrical connection, comprising an encoder configured to:

in response to determining a disparity between a first number of logic high bits and second number of logic low bits of a first portion of the data that has been encoded and transmitted through the electrical connection is greater than a threshold value, compute a polarity bit;

transmit the polarity bit through the electrical connection;

encode a second portion of the data for transmission by performing a logic operation on bits of the second portion of the data using the polarity bit; and transmit at least the threshold value quantity of the encoded second portion of the data before comparing the disparity with the threshold value.

19. The system of claim 18, wherein the encoder continues to transmit encoded subsequent bits of the data without transmitting an additional polarity bit during an inhibit period after the transmission of the polarity bit and until the disparity exceeds the threshold value.

20. The system of claim 18, wherein computing the polarity bit comprises:

scanning the second portion of the data to produce an additional disparity between a third number of logic high bits and a fourth number of logic low bits in the second portion; and determining a value of the polarity bit to reduce a combination of the disparity and the additional disparity.

21. A data transmission process comprising:

determining a logic level disparity for a transmitted codeword comprising a plurality of first data bits;

in response to determining the logic level disparity satisfies a threshold value, computing a lookahead logic level disparity for second data bits to transmit subsequent to the first data bits;

computing a polarity bit based on a combination of the logic level disparity and the lookahead logic level disparity; and transmitting the polarity bit and subsequently encoding the second data bits according to the polarity bit.

22. The data transmission process of claim 21, further comprising:

continuing to transmit the encoded second data bits; and updating the logic level disparity for each bit of the transmitted encoded second data bits.

23. The data transmission process of claim 22, further comprising disabling transmission of an additional polarity bit during an inhibit period after the transmission of the polarity bit and until the logic level disparity exceeds the threshold value.

24. A method of DC-balancing data for transmission through an electrical connection, comprising:

computing a disparity between a first number of logic high bits and second number of logic low bits of a first portion of the data that has been encoded and transmitted through the electrical connection;

in response to determining the disparity is greater than a threshold value, computing a lookahead disparity for a second portion of the data that immediately follows the first portion of the data;

computing a polarity bit based on a combination of the disparity and the lookahead disparity; and transmitting the polarity bit through the electrical connection.

25. The method of claim 24, further comprising:

in response to determining an additional disparity between a third number of logic high bits and a fourth number of logic low bits of the transmitted encoded first portion of the data is greater than the threshold value, extracting the polarity bit from the transmitted encoded data at a receiver that is coupled to the electrical connection;

updating a received polarity bit; and decoding subsequent encoded bits of the second portion of the data that are received after the polarity bit by performing a logic operation on the subsequent encoded bits using the received polarity bit.

26. The method of claim 25, further comprising receiving at least the threshold value quantity of the subsequent encoded bits before comparing the additional disparity with the threshold value.

* * * * *